May 22, 1928.
J. H. PEARCE
1,670,549
INTERNAL COMBUSTION ENGINE
Filed June 22, 1926     3 Sheets-Sheet 1
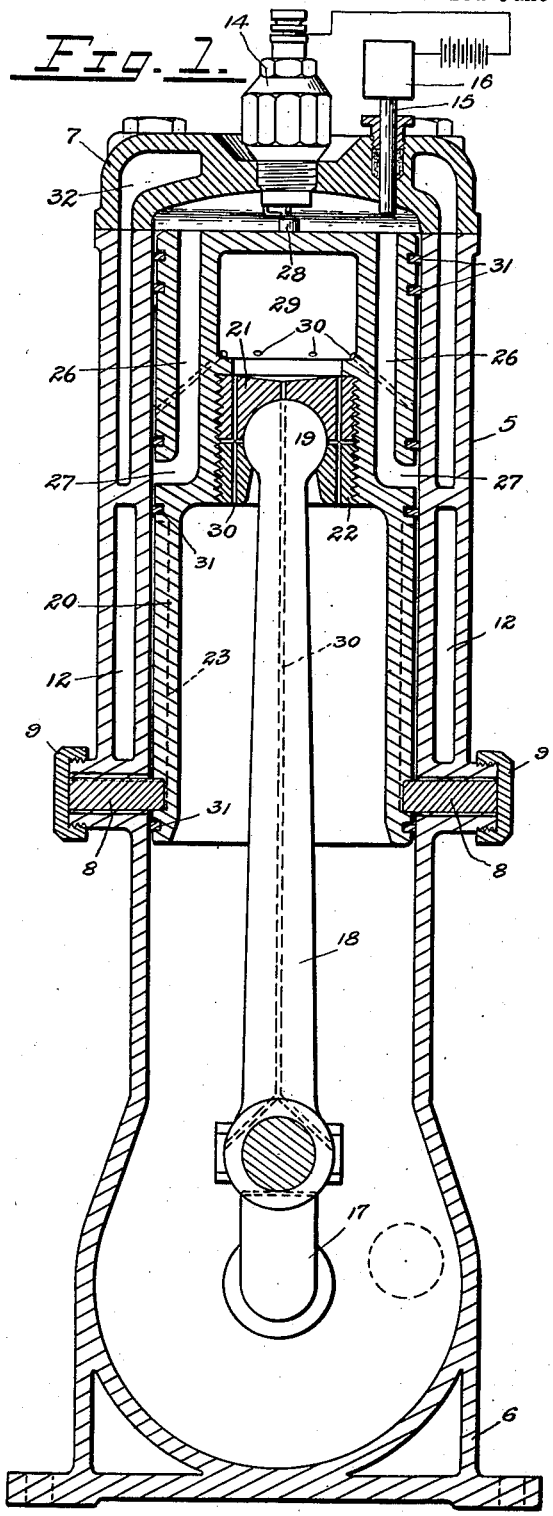
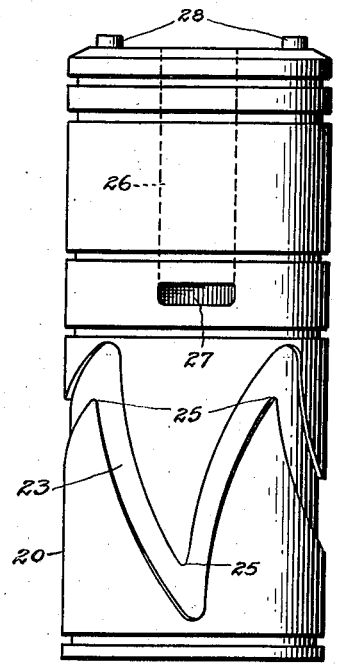
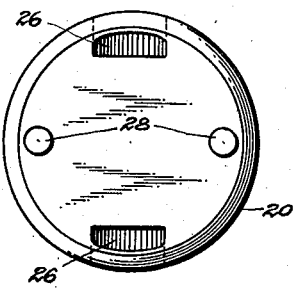
INVENTOR
John H. Pearce
BY
Frank Warren
ATTORNEY May 22, 1928.
J. H. PEARCE
INTERNAL COMBUSTION ENGINE
Filed June 22, 1926
1,670,549
3 Sheets-Sheet 2
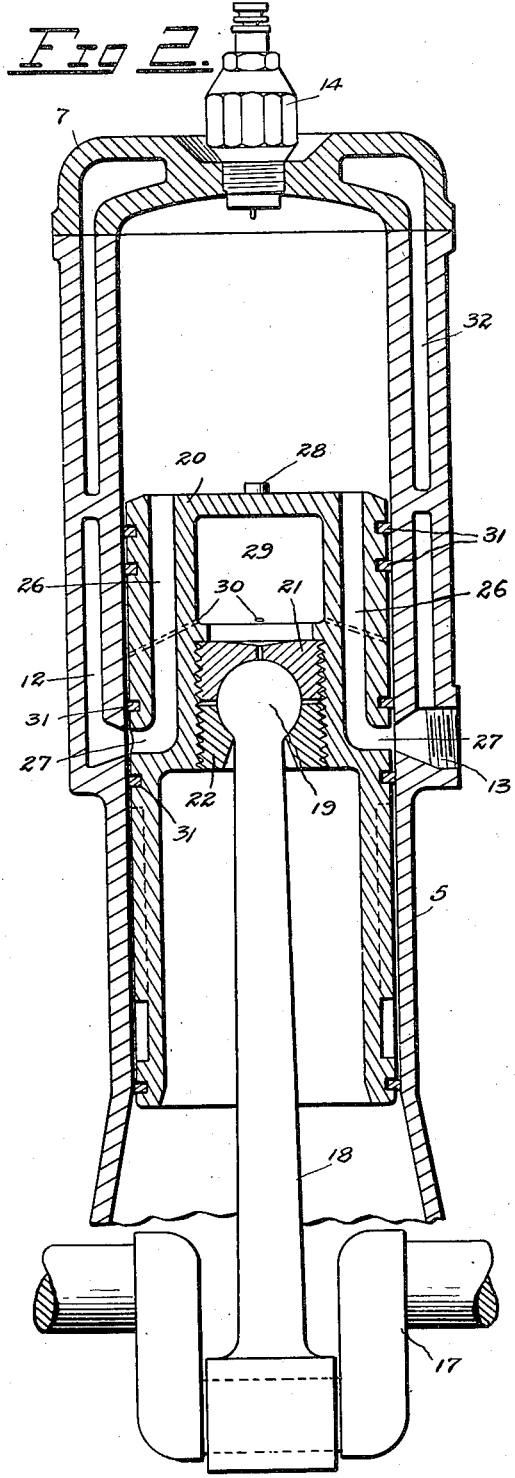
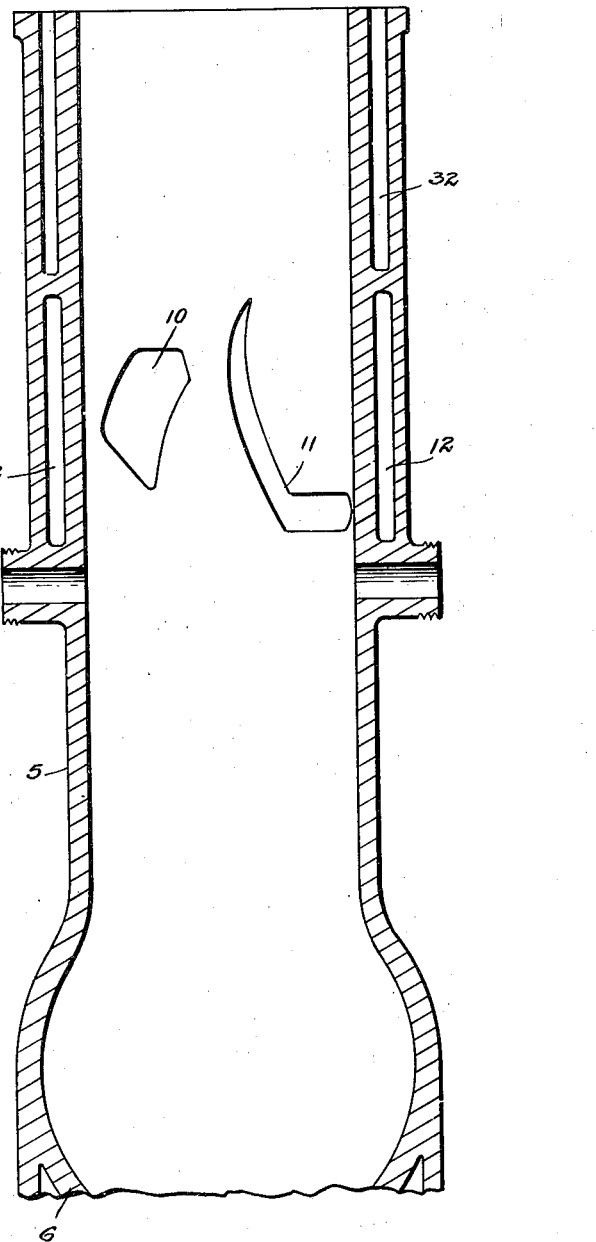
INVENTOR
John H. Pearce
BY
Frank Warren
ATTORNEY May 22, 1928.

J. H. PEARCE 1,670,549

INTERNAL COMBUSTION ENGINE

Filed June 22, 1926    3 Sheets-Sheet 3

INVENTOR
John H. Pearce
BY
Frank Warren
ATTORNEY

Patented May 22, 1928.

1,670,549

UNITED STATES PATENT OFFICE.

JOHN H. PEARCE, OF SEATTLE, WASHINGTON.

INTERNAL-COMBUSTION ENGINE.

Application filed June 22, 1926. Serial No. 117,681.

My invention relates to improvements in internal combustion engines and certain objects of the invention are to provide an engine with a piston that revolves while in reciprocal motion and to further provide the rotary piston with timing contacts for firing and with intake and exhaust means in connection with the cylinder. Some of the advantages in this arrangement are increased efficiency, elimination of carbon deposits and danger of scoring the cylinder walls, the elimination of the entire valve and timing systems, reduced weight and simpler construction, reduced cost of construction and maintenance, and the provision of an engine that will run equally well in either direction.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:

Figure 1 is a view in central vertical section of an engine embodying the principles of my invention taken through the piston guide pins, piston ports, and firing pin.

Fig. 2 is a similar view partly broken away and taken through the exhaust with the piston ports registering therewith.

Fig. 3 is a view in central vertical section of the cylinder with the piston removed and showing one of the suction and one of the exhaust ports.

Fig. 4 is a view in elevation of the piston.

Fig. 5 is a top plan view of the same.

Figure 6:
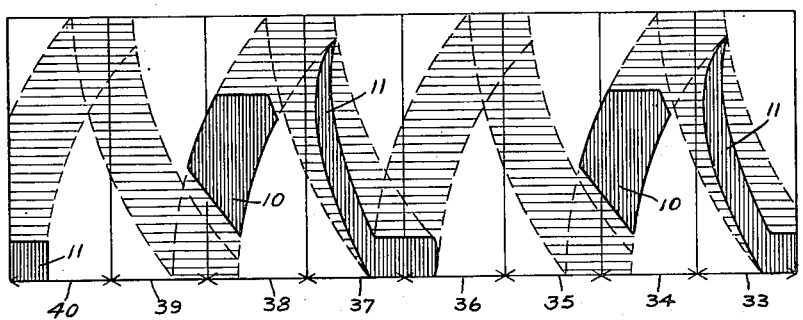
Fig. 6 is a development view of a portion of the cylinder wall along the path of the piston port openings.

Referring to the drawings throughout which like reference numerals designate like parts, the numeral 5 indicates the cylinder as a whole that is provided with the usual base portion 6 and cylinder head 7. Said cylinder is provided with diametrically opposite openings wherein are mounted piston guide pins or balls 8 that project slightly inside the cylinder chamber and are held in position by threaded caps 9. Said cylinder is further provided with diametrically opposite suction ports 10 and exhaust 11. Said suction and exhaust ports may be connected by a conduit 12 which may be sectioned off for incoming and exhaust gases and connected with an exterior port as shown at 13.

The cylinder head 7 is centrally provided with a spark plug 14 which gives an even pressure over the piston head when combustion takes place. A push rod 15 is also mounted in the cylinder head and projects into the cylinder chamber. The exterior end of said rod is connected with an inductive electric firing system 16 which is connected with the spark plug and produces the exploding spark as will be more fully hereinafter described. The crank shaft 17 of the engine is provided with the usual connecting rod 18 whose upper end terminates in a ball 19.

The piston designated as a whole by the numeral 20 is substantially twice as long as the ordinary gas engine piston and the cylinder walls are approximately three times the length of the stroke. The ball 19 of the rod 18 is connected with said piston by means of a socket formed within an upper plug 21 and a lower plug 22 that are threadedly secured therein. The socket joint thus formed is readily removable and adjustable and permits the piston to revolve freely on its vertical axis by means presently set forth.

Figure 7:
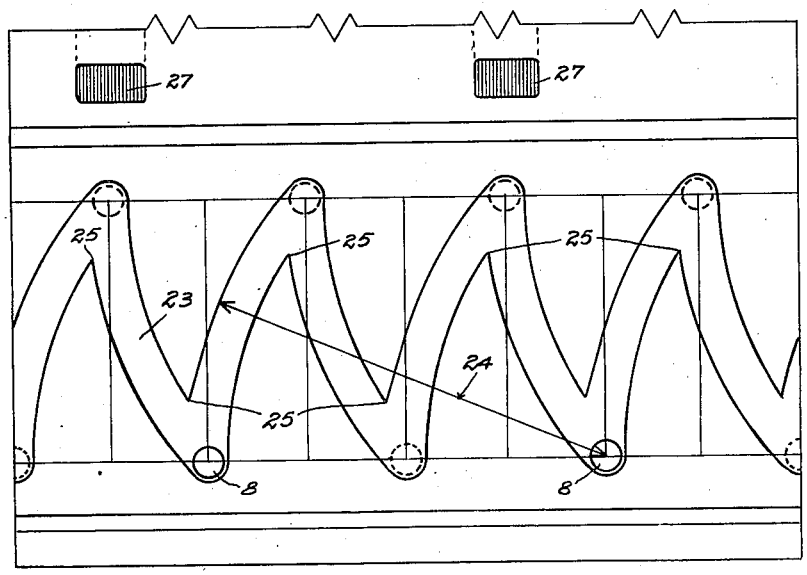
Fig. 7 is a development view of a portion of the piston showing the cam grooves arranged for one revolution of the piston to four revolutions of the crank.

The lower half of the piston outer surface is provided with cam grooves 23 that form a continuous zig-zag path around said piston as clearly shown in Figs. 4 and 7 of the drawings. The inner ends of the guide pins 8 fit within said grooves and as the piston 20 reciprocates up and down it will be caused to revolve about its vertical axis on the ball 19 by said pins as will be readily understood. As indicated by the arrow 24 in Fig. 7 said cam grooves are arcs of circles with radii whose centers are located at the centers of the guide pins when the piston reaches the extremity of its upward stroke. The points 25 of said grooves are disposed to one side of a vertical line through said pins at the limits of the stroke which will cause the piston to always revolve in the same direction although it will be understood that the crank shaft 17 will revolve in either direction in which it is started.

The piston 20 is provided with diametrically opposite conduits 26 which extend vertically down through the same to ports 27 on its sides that are normally closed by the cylinder walls. The lengths of said conduits are equal to the stroke of the engine. When the piston revolves said ports will be alternately brought into registration with the suction ports 10 for admission of fresh gas and with the exhaust ports 11 for discharge of spent gases.

Diametrically opposite firing buttons 28 are mounted on top of the piston 20 at substantially right angles to the ports 27. When said piston revolves the buttons will each engage the push rod 15 raising same at the proper time on the compression stroke for firing the compressed gas by means of the electric firing system 16.

A chamber 29 is provided within the upper portion of the piston 20 which in addition to decreasing weight and acting as a cooling chamber also serves as a reservoir for lubricant whereby the oil will pass through ducts 30 to lubricate the ball and socket joint, cylinder walls and other parts. Centrifugal action will obviously assist the oil in its passage through the ducts to the cylinder walls.

The piston is provided with the usual piston rings 31. Water jacket compartments 32 are provided in the upper portion of the cylinder walls and it will be understood that the walls may be cooled either by water or air. While the drawings show an engine designed for one revolution of the piston to four revolutions of the crank shaft, the device is not limited to this particular arrangement. By eliminating one firing button 28, one conduit 26, one exhaust port 11 and one suction port 10, same would be adapted for one revolution of the piston to two of the shaft.

Referring to Fig. 6 in the operation of the engine, and keeping in mind that the piston makes one revolution to four revolutions of the crank shaft, the cycle of one of the piston ports 27 will follow a path such as shown in the horizontal shading and will pass over the exhaust and suction ports shown in vertical shading. As the piston moves upwardly on the exhaust stroke 33 its rotary movement will cause said port to advance in an arc over the exhaust port 11 forcing the spent gases out. On its downward movement or suction stroke 34 said port will further advance in an arc over the suction port 10 taking fresh gas. At the limit of its next upward movement on the compression stroke 35 the piston will bring one of the firing buttons 28 into engagement with the push rod 15 whereby combustion will take place. On the downward or power stroke 36 the port will further advance to the lower end of the second exhaust port 11 over which it will travel on its upward or exhaust stroke 37. Then downwardly on the suction stroke 38 the port will pass over the second suction port 10 that is diametrically opposite the first one. On the upward or compression stroke 39 the piston will bring the second firing button 28 into engagement with the push rod 15 whereby combustion will again force said piston down on the power stroke 40 to the lower end of the first named exhaust port 11 thus completing the cycle of the piston port 27.

For the purpose of simplicity the foregoing description of the operation has only dealt with one of the piston ports 27. It will however be apparent that the other diametrically opposite piston port will register with the diametrically opposite suction port 10 at one and the same time and likewise with the exhaust ports 11. For upward or downward stroke of the piston it will revolve on its axis one-eighth of its circumference or one quarter for every revolution of the crank shaft.

One of the important features of the invention is the sustained pressure in the cylinder throughout the greater part of the power stroke which is caused by slower burning of the gas in the piston conduits 26. The dual motion of the piston will keep the cylinder walls smooth and round and will eliminate carbon deposits. The simplicity of the device will be manifest in the elimination of the valve and distributor systems together with other obvious features.

For convenience I have illustrated a single cylinder engine but it is obvious that an engine may consist of multiple cylinders of this type.

What I claim is:

An internal combustion engine comprising a cylinder, a piston, a connecting rod, a crank shaft, a ball and socket connection between said piston and rod, cam grooves on the piston, guide pins in the cylinder engaging said grooves and adapted to revolve the piston when same is reciprocated, diametrically opposite suction and exhaust ports for the cylinder, diametrically opposite conduits for the piston arranged to register with said suction and exhaust ports at predetermined intervals, firing buttons carried by the piston, a push rod arranged to be engaged by said buttons, ignition means adapted to be actuated by said push rod, and lubricating means carried by the piston adapted to be actuated by centrifugal and gravitational forces.

In witness whereof, I hereunto subscribe my name this 17th day of June A. D. 1926.

JOHN H. PEARCE.